United States Patent [19]

Corbin

[11] Patent Number: 4,573,131
[45] Date of Patent: Feb. 25, 1986

[54] METHOD AND APPARATUS FOR MEASURING SURFACE ROUGHNESS

[76] Inventor: John Corbin, 9707 Barlow Rd., Fairfax, Va. 22031

[21] Appl. No.: 528,268

[22] Filed: Aug. 31, 1983

[51] Int. Cl.⁴ .................. G01B 7/34; G06F 15/20
[52] U.S. Cl. .................... 364/554; 33/1 Q; 73/105; 364/566
[58] Field of Search ............... 364/560, 561, 554, 556; 33/1 Q; 73/104, 105, 146

[56] References Cited

U.S. PATENT DOCUMENTS

| | | | |
|---|---|---|---|
| 3,720,818 | 3/1973 | Sprage et al. | 364/554 |
| 3,805,036 | 4/1974 | Michaud et al. | 364/560 |
| 4,048,849 | 9/1977 | Gocho et al. | 73/105 |
| 4,075,888 | 2/1978 | Buhler | 73/146 |
| 4,084,324 | 4/1978 | Whitehouse | 73/105 X |
| 4,173,073 | 11/1979 | Fukazawa et al. | 33/1 Q |
| 4,181,958 | 1/1980 | Juengel et al. | 364/560 |
| 4,288,855 | 9/1981 | Panetti | 364/561 |

FOREIGN PATENT DOCUMENTS

| | | | |
|---|---|---|---|
| 2620895 | 3/1980 | Fed. Rep. of Germany | 173/105 |
| 158942 | 2/1983 | German Democratic Rep. | 73/105 |

*Primary Examiner*—Felix D. Gruber
*Attorney, Agent, or Firm*—Schwartz, Jeffery, Schwaab, Mack, Blumenthal & Evans

[57] ABSTRACT

A surface roughness measuring method and apparatus for use in rail corrugations. The apparatus utilizes non-inertial sensors coupled to an on-board, real-time data processing unit. The method includes spacing a plurality of sensors along the surface at predetermined distances apart from one another, relatively moving the sensors and the surface, sampling data from the sensors at fixed sample distance intervals L, storing data from the sensors measured over a region of the surface, converting the data into second finite difference data over the region, converting the second finite difference data into data representative of a space curve of the surface, and displaying the space curve representative data to provide an indication of surface roughness.

35 Claims, 24 Drawing Figures $S = m+n$
$m' = \text{Min}(m,n)$
$n' = |m-n|$ $\quad S' = m'+n'$
$\gamma = \text{SIGN}(m-n) * S$
$\alpha = n \quad \beta = m$

FIG. 2

| STEP | DESCRIPTION | 1 | 2 | 3 | 4 | 5 | 6 | 7 | 8 | 9 | 10 | 11 | 12 | 13 | 14 | 15 | 16 | 17 | 18 | 19 | 20 : x → |
|---|---|---|---|---|---|---|---|---|---|---|---|---|---|---|---|---|---|---|---|---|---|
| 1 | ACO (3,8) | -3/11 | | | | | | | | 1 | | | -8/11 | | | | | | | | |
| 2 | ACO (8,3) | | | | | | | | | -8/11 | | | 1 | | | | | | | -3/11 | |
| 3 | 11 ACO (3,8) | 3 | | | | | | | | 11 | | | -8 | | | | | | | | |
| 4 | 11 ACO (8,3) | | | | | | | | | -8 | | | 11 | | | | | | | -3 | |
| 5 | D11 ACO (3,8) | -3 | | | | | | | | 11 | | | -8 | | | | | | | | |
| 6 | 11 ACO (8,3) | -8 | | 11 | | | | | | | | | -3 | | | | | | | | |
| 7 | -3 × STEP 5 | 9 | | | | | | | | -33 | | | 24 | | | | | | | | |
| 8 | 8 × STEP 6 | -64 | | 88 | | | | | | | | | -24 | | | | | | | | |
| 9 | 88 ACO (5,3) | -55 | | 88 | | | | | | -33 | | | | | | | | | | | |
| 10 | 8 × STEP 5 | -24 | | | | | | | | 88 | | | -64 | | | | | | | | |
| 11 | -3 × STEP 6 | 24 | | -33 | | | | | | | | | 9 | | | | | | | | |
| 12 | 88 ACO (3,5) | | | -33 | | | | | | 88 | | | -55 | | | | | | | | |
| 13 | DIVIDE STEP 9 BY 11 | -5 | | 8 | | | | | | -3 | | | | | | | | | | | |
| 14 | DIVIDE STEP 12 BY 11 | | | -3 | | | | | | 8 | | | -5 | | | | | | | | |
| 15 | DELAY STEP 14 | -3 | | | | 8 | | | | -5 | | | | | | | | | | | |
| 16 | STEP 13 | -5 | | 8 | | | | | | -3 | | | | | | | | | | | |
| 17 | -3 × STEP 15 | 9 | | | | -24 | | | | 15 | | | | | | | | | | | |
| 18 | 5 × STEP 16 | -25 | | 40 | | | | | | -15 | | | | | | | | | | | |
| 19 | 40 ACO (2,3) | -16 | | 40 | -24 | | | | | | | | | | | | | | | | |
| 20 | 40 ACO (3,2) | | | -24 | 40 | -16 | | | | | | | | | | | | | | | |
| 21 | DIVIDE STEP 19 BY 8 | -2 | | 5 | -3 | | | | | | | | | | | | | | | | |
| 22 | DIVIDE STEP 20 BY 8 | | | -3 | 5 | -2 | | | | | | | | | | | | | | | |
| 23 | STEP 21 | -2 | | 5 | -3 | | | | | | | | | | | | | | | | |
| 24 | DELAY STEP 22 | -3 | 5 | | -2 | | | | | | | | | | | | | | | | |
| 25 | -2 STEP 23 | 4 | | -10 | 6 | | | | | | | | | | | | | | | | |
| 26 | 3 STEP 24 | -9 | 15 | -6 | | | | | | | | | | | | | | | | | |
| 27 | 15 ACO (1,2) | -5 | 15 (-10) | | | | | | | | | | | | | | | | | | |
| 28 | 15 ACO (2,1) | | -10 | 15 | -5 | | | | | | | | | | | | | | | | |
| 29 | DIVIDE STEP 27 BY 5 | -1 | 3 (-2) | | | | | | | | | | | | | | | | | | |
| 30 | DIVIDE STEP 28 BY 5 | | -2 | 3 | -1 | | | | | | | | | | | | | | | | |
| 31 | STEP 29 | -1 | 3 (-2) | | | | | | | | | | | | | | | | | | |
| 32 | DELAY STEP 30 | -2 | 3 | -1 | | | | | | | | | | | | | | | | | |
| 33 | -1 STEP 31 | 1 | -3 | 2 | | | | | | | | | | | | | | | | | |
| 34 | 2 STEP 32 | -4 | 6 | -2 | | | | | | | | | | | | | | | | | |
| 35 | 6 ACO (1,1) | -3 | 6 | -3 | | | | | | | | | | | | | | | | | |
| 36 | 6 ACO (1,1) | | -3 | 6 | -3 | | | | | | | | | | | | | | | | |

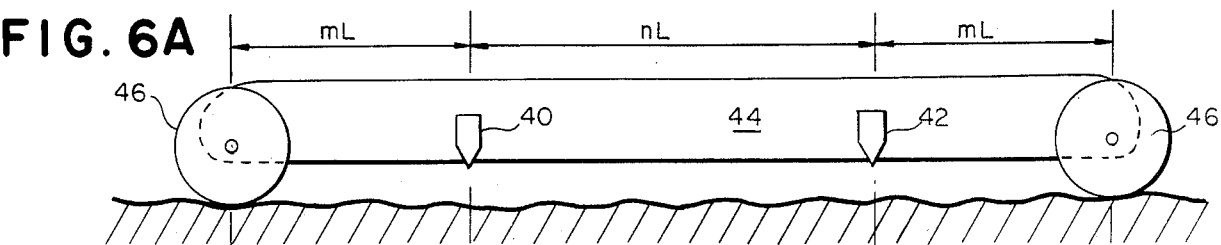
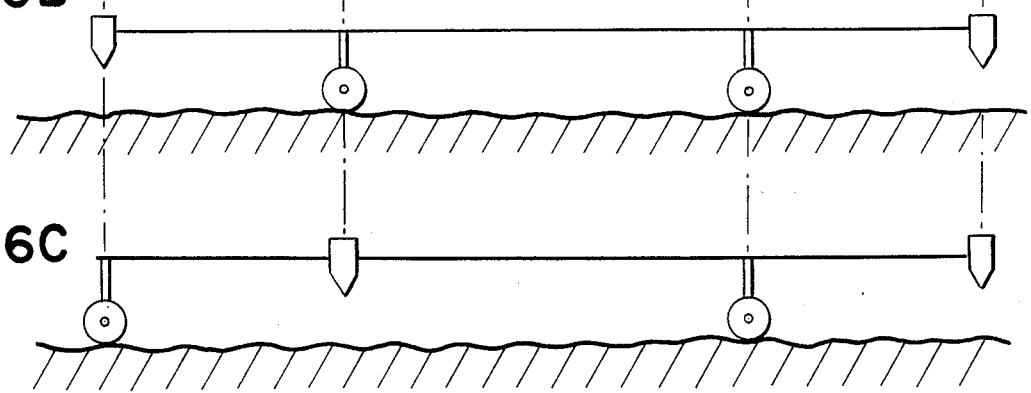
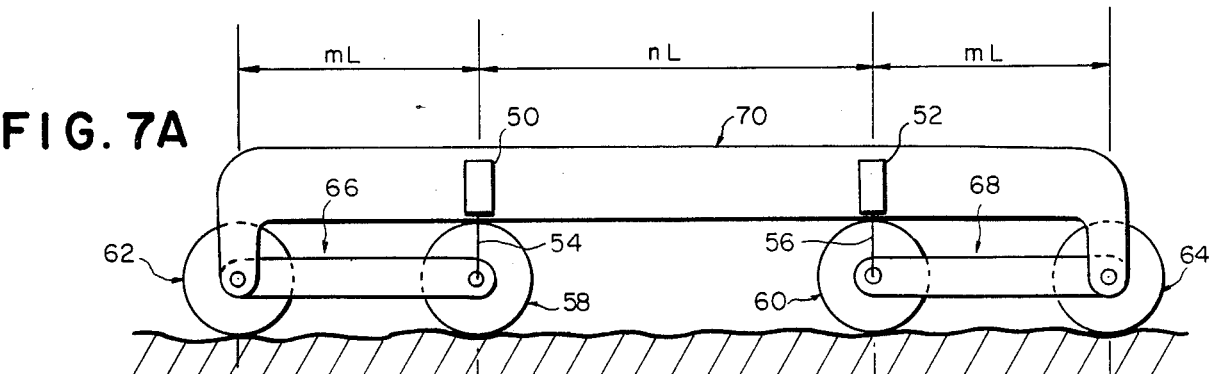
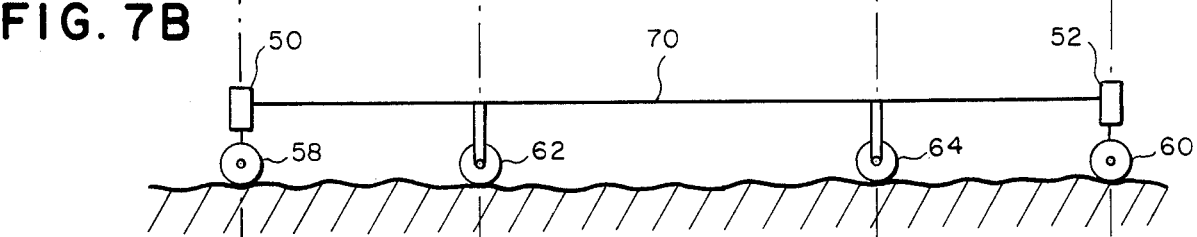
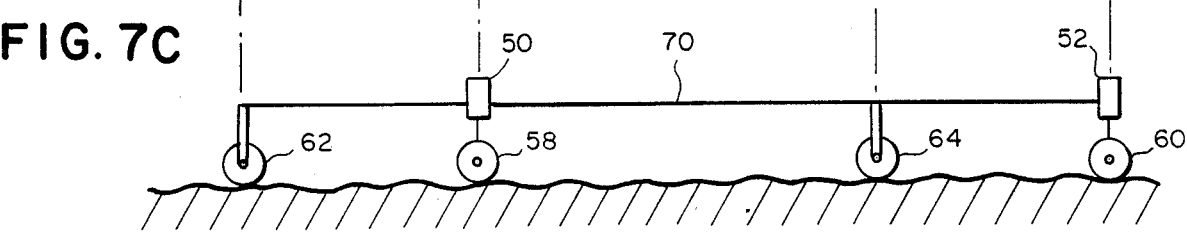

FIG. 10

| STEP | 1 | 2 | 3 | 4 | 5 | 6 | 7 | 8 | 9 | 10 | 11 | 12 | 13 | 14 | 15 | 16 | 17 | 18 | 19 | 20 | x → |
|------|---|---|---|---|---|---|---|---|---|----|----|----|----|----|----|----|----|----|----|----|---|
| 1 | -1 | 1 | | | | | | | | | | 1 | -1 | | | | | | | | |
| 2 | 9/11 | -13/11 | | | | | | | | | | 13/11 | -9/11 | | | | | | | | |
| 3 | -9 | 9 | | | | | | | | | | 9 | -9 | | | | | | | | |
| 4 | 9 | -13 | | | | | | | | | | 13 | -9 | | | | | | | | |
| 5 | | 18 | -18 | | | | | | | | | | -18 | 18 | | | | | | | |
| 6 | | -18 | 26 | | | | | | | | | | -26 | 18 | | | | | | | |
| 7 | | | -14 | 14 | | | | | | | | | | 14 | -14 | | | | | | |
| 8 | | | 18 | -26 | | | | | | | | | | 26 | -18 | | | | | | |
| 9 | | | | 10 | -10 | | | | | | | | | | -10 | 10 | | | | | |
| 10 | | | | -18 | 26 | | | | | | | | | | -26 | 18 | | | | | |
| 11 | | | | | -6 | 6 | | | | | | | | | | 6 | -6 | | | | |
| 12 | | | | | 18 | -26 | | | | | | | | | | 26 | -18 | | | | |
| 13 | | | | | | 2 | -2 | | | | | | | | | | -2 | 2 | | | |
| 14 | | | | | | -18 | 26 | | | | | | | | | | -26 | 18 | | | |
| 15 | | | | | | - | 2 | -2 | | | | | | | | | | -2 | 2 | | |
| 16 | | | | | | | 18 | -26 | | | | | | | | | | 26 | -18 | | |
| 17 | | | | | | | | -6 | 6 | | | | | | | | | | 6 | -6 | |
| 18 | | | | | | | | -18 | 26 | | | | | | | | | | -26 | 18 | |
| 19 | | | | | | | | | 10 | -10 | | | | | | | | | | -10 | 10 |
| 20 | | | | | | | | | 18 | -26 | | | | | | | | | | 26 | -18 |
| 21 | | | | | | | | | | -14 | 14 | | | | | | | | | 14 | -14 |
| 22 | | | | | | | | | | -18 | 26 | | | | | | | | | -26 | 18 |
| 23 | | | | | | | | | | | 18 | -18 | | | | | | | | -18 | 18 |
| 24 | | | | | | | | | | | 18 | -26 | | | | | | | | 26 | -18 |
| 25 | | | | | | | | | | | | -9 | 9 | | | | | | | 9 | -9 |
| 26 | | | | | | | | | | | | -9 | 13 | | | | | | | -13 | 9 |

0 0 0 0 0 0 0 0 0 0 44 -88 44 0 0 0 0 0 0 0 0

MCO (-1/2, 1, -1/2)

FIG. 12

|  |  | mL | mL | nL |
|---|---|---|---|---|
| SENSER | 4 | 6 | 8 | 10 |

| STEP | DESCRIPTION | 1 | 2 | 3 | 4 | 5 | 6 | 7 | 8 | 9 | 10 | 11 x⟶ |
|---|---|---|---|---|---|---|---|---|---|---|---|---|
| 1. | $(2m+n)$ ACO $(m, m+n)$ | | | | $-m-n$ | | | | $2m+n$ | | | $-m$ |
| 2. | $(m+n)$ ACO $(m,n)$ | | | | $-n$ | | | | $m+n$ | | | $-m$ |
| 3. | $n \times$ STEP 1 | | | | $-mn-n^2$ | | | | $2mn+n^2$ | | | $-mn$ |
| 4. | $-(m+n) \times$ STEP 2 | | | | $mn+n^2$ | | | | $-m^2-2mn-n^2$ | | | $m^2+mn$ |
| 5. | ADD STEPS 3 & 4 | | | | 0 | | | | $-m^2$ | | | $m^2+mn$ | $-mn$ |
| 6. | $m(m+n)$ ACO $(n,m)$ | | | | | | | | $-m^2$ | | | $m^2+mn$ | $-mn$ |

(Note: Step 5 also shows $-mn$ at position 11; Step 6 shows values at positions 8, 10, 11.)

FIG. 14

|  | mL | nL | $(m+n)L$ |
|---|---|---|---|
| SENSER 4 | 6 | 8 | 12 |

| STEP | DESCRIPTION | 1 | 2 | 3 | 4 | 5 | 6 | 7 | 8 | 9 | 10 | 11 | 12 x⟶ |
|---|---|---|---|---|---|---|---|---|---|---|---|---|---|
| 1. | $(m+n)$ ACO $(m,n)$ | | | | | | | | $-n$ | | | $m+n$ | $-m$ |
| 2. | $(2n+m)$ ACO $(n, m+n)$ | | | | | | | | $-m-n$ | | | $m+2n$ | $-n$ |
| 3. | $-n \times$ STEP 1 | | | | | | | | $n^2$ | | | $-mn - n^2$ | $mn$ |
| 4. | $m \times$ STEP 2 | | | | | $-m^2-mn$ | | | $m^2+2mn$ | | | | $-mn$ |
| 5. | ADD STEPS 3 & 4 | | | | | $-m^2-mn$ | | | $n^2+m^2+2mn$ | | | $-mn-n^2$ | 0 |
| 6. | $(m+n)^2$ ACO $(n,m)$ | | | | | $-m^2-mn$ | | | $n^2+m^2+2mn$ | | | $-mn-n^2$ | |

METHOD AND APPARATUS FOR MEASURING SURFACE ROUGHNESS

FIELD OF THE INVENTION

The invention is in the field of roughness measurements generally, and more particularly in the field of surface corrugation measurements utilizing non-inertial direct measurements. A specific embodiment of the invention is in the field of rail corrugation measurements.

BACKGROUND OF THE INVENTION

Surface roughness is a term used to describe the physical profile of a surface and may be taken to include random surface deformations as well as periodic deformations. Surface corrugations is a term used to describe periodic deformation. Corrugations have been a major source of concern to the railroad and transit industries. In railroads and transit operations, such corrugations appear around curves of the railroad track and in areas of repeated or consistent application of heavy breaking. They result from vibration induced slippage of one or more of the wheels in the wheel set. Such slippage tends to take place at the same spots so that the amplitude of the corrugations become larger quite rapidly after they have begun. Such corrugations are undesirable since the vibrations caused by the corrugated rail tends to loosen rail fastenings, displace ballast and damage the rolling stock and cargo. Additionally, such corrugations tend to accelerate deterioration of the track roadbed, not to mention the general deterioration of the rail itself. From the passenger point of view, corrugations are noticeable in producing unwanted vibrations and excessive roaring noise. The corrugation characteristics depend upon the mechanical characteristics of the train and the elasticity of the railroad track, the speed of the train and the train speed in relation to the track curvature. Periodic maintenance work is scheduled to correct rail corrugations based on either historical data or measurements of the rail corrugations. Measurements of the rail corrugations are typically done both before and after rail maintenance procedures to ensure correction of the undesirable deformations at each of the wavelengths which are measured. Such wavelengths of interest are in the range of 3 centimeters to 3 meters. However, typically many different wavelengths are superimposed along a section of the track thus complicating detection techniques. Railroad maintenance may include, among other things, the use of grinding wheels or abrasive blocks moved along the rail surface.

There are basically two types of measurement systems employed in corrugation detection; namely, inertial and non-inertial systems. Inertial systems utilize inertial sensors to provide an indirect surface measurement. Such sensors operate by detecting an acceleration, either translational or rotational, between the rail surface and the supporting chassis. Non-inertial systems utilize noninertial sensors which operate to directly measure the distance between the supporting chassis and the rail. Such non-inertial sensors may be classified as belonging to the contacting or non-contacting type. The contacting type of detector may simply be in the form of an auxiliary wheel or feeler in which the vertical displacement of the wheel is detected by electromechanical means. Non-contacting sensors may be of the eddy current type, acoustical or electromagnetic. An example of a non-inertial data measuring and processing system is shown in U.S. Pat. No. 4,288,855.

Corrugation, and more generally, surface roughness problems are not isolated to the railroad industry. Highway roughness, including corrugations, are a major contributor to highway wear, particularly at intersections where the road surface is subjected to large stresses from acceleration and deceleratio of passing vehicles. In pouring concrete for forming highway surfaces, roughness is an important characteristic which affects the quality of the finished product and its longterm wear characteristics. In such an environment, a non-contacting type sensor is important since the measuring equipment cannot itself contribute to surface roughness.

Surface roughness problems are also noticeable in other technologies such as pipe and drum fabrication or more generally in the measurement of any surface contour. The surfaces of gears, cams and many types of precision equipment require accurate measurements of surface profile.

A particular problem inherent in the utilization of inertial sensors for roughness and corrugation measurements, for example rail corrugation measurements, is the fact that such sensors are subject to small signal to noise ratios at low vehicle speeds. Concomittantly, the integration time must be greatly increased in order to permit translation of the acceleration data into profile information of a given wavelength. With such long integration times, the data suffers from even lower signal to noise ratios. Non-inertial sensors of the contact type suffer from the influence of chassis vibrations caused, for example, by wheel roughness and inherent chassis elasticity. Non-contact sensors do not suffer from the same vibrational problems as sensors of the contact type but generally do require a larger number of detecting units which results in proportionally larger maintenance problems. A problem which is inherent in both inertial and non-inertial detectors is related to the plural frequency components of the corrugations. Typically, the sensor response contains nulls at different wavelengths. Methods have been devised to try and effectively remove such nulls by utilizing different measuring bases of different lengths so that the wavelenghts which are susceptible to poor response will not overlap in the simultaneous measurement. An example of such a teaching is shown in U.S. Pat. No. 4,075,888.

SUMMARY OF THE INVENTION

It is an object of the invention to overcome the disadvantages of the prior art and provide a roughness measuring method and apparatus which has a favorable output response characteristic over all frequencies of interest.

Another object of the invention is to provide an effective rail corrugation method and apparatus utilizing non-inertial sensors.

A further object of the invention is to provide a non-inertial rail corrugation detection method and apparatus employing an on-board, real-time, data processing unit. The output of the data processor may be easily interpreted by operators thereof to ascertain the extent and severity of rail corrugations. Such real-time indications of rail roughness have a distinct advantage over prior art off-line systems in which there is no immediate feedback to the operator of the measuring and data accumulating equipment. By providing a nearly immediate feedback (processing delays are a fixed distance which is on the order of twice the longest wavelength of interest which may be considered nominal), the operator or track supervisor is able to correlate his or her subjective determination of rail roughness with a physical trace on an output chart or a display CRT. The subjective/objective correlation gives a much more realistic interpretation of the data than that which would be available from studying off-line data alone.

Another object of the invention is to provide a real-time data analysis and display apparatus and method for detecting, analyzing and displaying surface roughness. The real-time system in accordance with the invention permits an immediate determination of surface roughness which is important, for example, in the area of road building in which surface irregularities must be corrected prior to hardening of the road surface, e.g. concrete. Other applications of the real-time system include the manufacture of pipes, tires, drums, gear surfaces and, in fact, any surface whether it be spherical, cylindrical or nonlinear. A basic feature of the invention is to permit an accurate determination of the surface profile, and there is basically no restriction on the type of surface which can be measured. The measured profile can be displayed directly or the system can digitally compare the measured profile with the desired profile to provide an indication of deviations from the desired profile.

The invention may be characterized as a method of measuring surface corrugations comprising the steps of securing first, second, third and fourth sensors to a rigid support, relatively moving the rigid support and the surface, sampling data outputs of all of the sensors at fixed distance intervals L, processing the sampled data in a data processing device for converting the sample data into data corresponding to a symmetric cord offset geometry as represented by second finite difference data, converting the second finite difference data into data representative of a space curve of the surface, and displaying the space curve data for providing a measurement of surface corrugations. In the step of securing the sensors to the rigid support, the first and second sensors are spaced apart by a distance mL, the second and third sensors are spaced apart by a distance nL, and the third and fourth sensors are spaced apart by a distance mL. The numbers m and n are integers having no common factors. The positioning of the sensors establishes a first asymmetric cord configuration comprising first, second and third sensors and a second asymmetric cord configuration comprising second, third and fourth sensors said first and second asymmetric cord configurations being mirror images of one another about a plane midway between the second and third sensors. The processing step includes weighing the data outputs from the first, second and third sensors in accordance with their relative displacements as defined by the integers m, n, to form a first asymmetric cord offset (ACO) measurement, weighing the data outputs from the second, third and fourth sensors in accordance with their relative displacements as defined by the integers m, n, to form a second ACO measurement, said first and second ACO measurements insensitive to rigid body motion. The processing step also includes the step of combining the first and offset ACO measurements to form at least one mid-cord offset (MCO) measurement corresponding to weighted data from first, second and third hypothetical sensors positioned one sample distance interval apart. The data corresponding to the hypothetical sensors is simply proportional to the second finite difference data which is readily convertible into the space curve of interest.

The invention may also be described as a method of measuring surface roughness comprising the steps of spacing a plurality of sensors along a surface at predetermined distance intervals apart from one another, relatively moving the sensors and the surface, sampling data from the sensors at fixed sample distance intervals L, storing data from the sensors measured over a region of said surface, converting the measured data into second finite difference data over said region, converting the second finite difference data into data representative of a space curve of the surface, and providing an indication of said space curve data. In spacing the plurality of sensors along the surface, the spacing is selected such that the response characteristic of the plurality of sensors is non-zero for all wavelengths of the surface roughness in excess of a predetermined folding wavelength.

BRIEF DESCRIPTION OF THE DRAWINGS

These and other objects of the invention will become clear in relation to the following description taken in conjunction with the drawings, wherein:

FIG. 2 illustrates the various steps utilized by the data processing means in accordance with the invention utilizing the sensor geometry of FIG. 1;

FIGS. 6A–6C show a second embodiment of the invention utilizing two non-contact sensors;

FIGS. 7A–7C show a third embodiment of the invention utilizing two sensors of the contact-type;

FIG. 10 shows the steps performed by the data processing means in analyzing data from the sensor configuration of FIG. 9 for a particular geometrical arrangement with m=2 and n=11;

FIG. 12 illustrates the data processing steps appropriate for the embodiment of FIGS. 11A and 11B;

FIG. 14 illustrates the data processing steps appropriate for the embodiment of FIGS. 13A and 13B.

DETAILED DESCRIPTION OF THE PREFERRED EMBODIMENT

Figure 1:
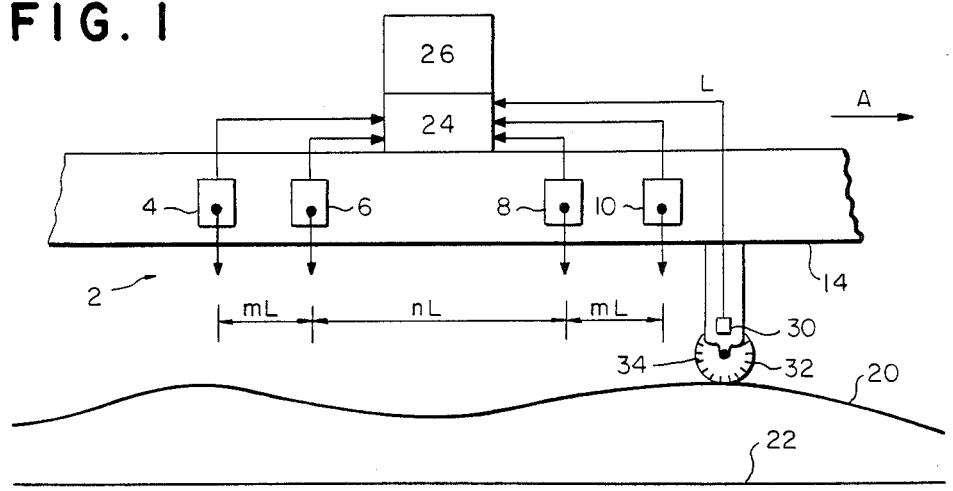
FIG. 1 illustrates one embodiment of the invention wherein four non-contact sensors are utilized.

A first embodiment of the invention is illustrated in FIG. 1. As seen in FIG. 1, a sensor array 2 is provided comprising a plurality of individual sensors 4, 6, 8 and 10. Each individual sensor is secured on a support member 14 which may be a frame or chassis of a vehicle or any rigid support attached thereto. The wheels supporting the frame or chassis which in turn directly or indirectly support the support member 14 are not illustrated in the drawing but would extend to the left of the sensor 4 and to the right of sensor 10. The sensors 4, 6, 8 and 10 are utilized to provide signals representative of the distance between the respective sensors and a rail 20 on which the vehicle is traveling. The rail 20 is shown to have a corrugated surface which is greatly exaggerated for purpose of illustration. The corrugated surface may be referenced to an inertial frame of reference 22 as, for example, the earth.

Each of the sensors 4, 6, 8 and 10 may comprise, for example, an eddy current sensor manufactured, for example, by Kaman Sciences and having a diameter between ¾ inch and 1⅛ inch. These eddy current sensors are of the analog type and may be utilized together with gain and zero suppression amplifiers. Analog signals provided from the sensors are fed to a data processing apparatus 24. The data processing apparatus 24 is utilized to convert the analog signals into digital form to process the data to generate desired space curve data which provides a measure of the surface roughness or corrugations. The space curve is presented on a display device 26 which is connected to the data processing apparatus 24. The display device 26 may comprise, for example, a strip chart, a CRT display or a simple printout providing the numerical values of the space curve as a function of distance traveled along the rail. The data processing apparatus also receives a signal from an encoder 30 connected to a wheel 32 which is also supported by the support frame 14 or may alternately be supported by other portions of the chassis or carriage. Optical or magnetic markers 34 may be provided on the wheel 32 so that the encoded signals from the encoder 30 are representative of the distance traveled by the wheel 32 along the rail 20. Most desirably, the signals generated by the encoder 30 are spaced apart by a distance L measured along the surface of the rail 20.

An alternate method of determining distance traveled is to utilize an optically encoded tape attached to the rail. Optical detectors may then be secured to the support frame 14 or other portions of the vehicle chassis to detect the encoded marks for providing electrical impulses for feeding to the data processing apparatus 24. These techniques would be practical for small distances, perhaps utilized with a hand held measuring device.

The sensor array 2 together with the data processing apparatus 24 and display device 26 permits a real-time data collection and analysis to be undertaken so that the corrugated measurement may be made and the resulting space curve displayed shortly after the vehicle has traversed the portion of the track desired to be measured. Such real-time processing is important inasmuch as the resulting space curve is not an exact representation of the absolute geodetic survey of the surface because the long wavelength components (i.e. components greater than about 3–10 times the beam length), resulting from the effects of terrain and other such influences are not measured in the space curve results. For example, if the train is going up a long grade, such long wavelength components will typically not be measured by the sensors, or, if measured, may be eliminated in the data processing. Direct observation on a real-time basis thus permits the operator to assess the impact of and eliminate such geometric irregularities which may have an adverse response on the part of the traversing vehicle.

The four sensors 4, 6, 8 and 10 of FIG. 1 collect data at each L sample interval where L is the linear distance measured by the encoder 30 along the rail 20. Thus, data is analyzed coming from the sensors at space points kL where, k=0, 1, 2.... The spacing of the sensors as seen in FIG. 1 is such that the distance between sensors 4 and 6 as well as the distance between sensors 8 and 10 is selected to be mL. The distance between sensor 6 and 8 is selected to be nL. The numbers m and n are integers and have no common factors. By way of example, in FIG. 1, m=3 and n=8.

In the analysis of the data provided by the sensors 4, 6, 8 and 10, two asymmetric cord offsets (ACO) may be formed. A first ACO may be formed by combining the outputs of sensors 4, 6 and 8, and a second ACO may be formed by combining the outputs of sensors 6, 8 and 10.

An important feature of the data processing technique employing the two ACO's is that the data may be utilized in real-time to generate a space curve or other equivalent representation of the corrugation surface that provides an all-wavelength coverage. Thus, the data derived from the ACO measurements is responsive to all wavelengths between the folding wavelength (the shortest wavelength of legitimate interest in sample data) and an arbitrarily long wavelength. Thus, the utilization of ACO measurements provides an advantage over mid-cord offset measurements in providing measurements which are responsive to a much broader range of wavelengths. The utilization of the two mirror image ACO measurements in accordance with the method and apparatus of the invention provides a unique advantage of enabling the all-wavelength response of the ACO data to be converted into a usable form representative of the corrugation space curve.

The outputs of the sensors 4, 6, 8 and 10 are combined in a linear algebraic relationship to produce the ACO measurement. Data from each of the sensors are weighted in accordance with their relative distance from one another, and the ACO measurement may be defined as follows:

$$ACO\,(m,n) = \frac{-n}{m+n} y(4) + y(6) + \frac{-m}{m+n} y(8), \quad (1)$$

where y(i) is the data provided from sensor i.

Similarly, the second measurement is formed by the mirror image of the first ACO and is given by:

$$ACO\,(n,m) = \frac{-n}{m+n} y(6) + y(8) + \frac{-n}{m+n} y(10). \quad (2)$$

The coefficients which multiply the values, y(i), are selected such that the ACO measurement as a whole is insensitive to both linear and rotational rigid body motion.

In accordance with a first embodiment of the invention, a delay technique may be utilized in converting the ACO measurements into a second finite difference curve which in turn may be converted into the desired space curve. The first technique employs delaying one ACO measurement with respect to the other and combining the data to obtain mid-cord offset data. The combining step includes the steps of cross multiplying and summing the two measurements and repeating the delaying, cross multiplication and summing technique to reduce the asymmetric cord data into symmetric cord data, i.e., mid-cord offset data. The mid-cord offset data is well known to be directly proportional to the second finite difference data which itself may be readily converted by standard double integration techniques into the desired space curve.

To illustrate the first technique of obtaining second finite difference data from the asymmetric cord offset data, reference is made to FIG. 2 in which 20 discrete sample points are tabulated wherein the distance between each point is assumed to be a fixed sampling value, for example L=1 foot. One may assume that the measuring device is moving to the right such that for any given detector, sample point 1 occurs later in time than sample point 20. It is to be noted that the analysis assumes that the four sensors have each traversed the particular area of the track to be measured, and it may thus be assumed that data exists for each sensor corresponding to each of the discrete sample points 1-20 as shown in the table of FIG. 2.

Steps 1 and 2 illustrate the particular weighing factors in accordance with equations 1 and 2 wherein $n=3$ and $m=8$. To simplify the calculations, the denominator 11 may be factored out by multipyling ACO (3, 8) and ACO (8, 3) by a factor of 11. Steps 3 and 4 show the results of such a multiplication. It is now desirable to combine the ACO (3, 8) data with a delayed version of the ACO (8, 3) data such that certain values will cancel out. Steps 5 and 6 rewrite the ACO coefficients of step 3 and 4 with step 4 delayed by eight sample data points. Step 6 thus considers the ACO data (8, 3) taken at a spatial position eight samples earlier than the sample data of step 4. The earlier taken ACO (8, 3) data of step 6 is thus delayed (stored) in relation to the ACO (3, 8) data of step 5.

The coefficients in steps 5 and 6 may now be multiplied to obtain cancellation of the data corresponding to the end points. This may be done by multiplying the coefficient of step 5 by a value of $-3$ and by multiplying the coefficients of step 6 by a value of 8. The corresponding coefficients are shown in steps 7 and 8. The addition of steps 7 and 8 is shown in step 9 which is seen to be 88×ACO (5, 3). Steps 5 and 6 may be further manipulated as in steps 0 and 11 by multiplying the coefficients of step 5 by 8 and step 6 by $-3$ to obtain cancellation of the other end point data coefficient resulting in step 12 which is simply 88×ACO (3, 5). The coefficients of steps and 12 may be simplified by dividing by 11 to obtain steps 13 and 14. Step 13 is simply 8×ACO (5, 3) and step 14 is simply 8×ACO (3, 5).

The coefficients of step 14 are now delayed (stored) such that the end sample points line up with the end sample points of step 13. The result is shown in steps 15 and 16. Again, matrix multiplication is utilized to obtain cancellation of one of the end points as shown in steps 17 and 18 with the resulting addition of the coefficients resulting in step 19 which is seen to be 40×ACO (2, 3). In a similar fashion, step 20 may be obtained by multiplying the coefficients of step 15 by 5 and step 16 by $-3$ and adding the two together to obtain 40×ACO (3, 2). The coefficients of steps 19 and 20 may now be simplified by dividing out an 8 as shown in steps 21 and 22. The coefficients of steps 22 are now delayed by three sample lengths to obtain alignment of the end point sensor data as shown in steps 23 and 24. Matrix multiplication as shown in steps 25 and 26 may be utilized to eliminate the right-hand sensor point data as shown in step 27 to obtain 15×ACO (1, 2). In a similar fashion, step 28 shows the coefficients obtained by multiplying the coefficients of step 23 by 3 and step 24 by $-2$ to obtain 15×ACO (2, 1). Again, the coefficients of steps 27 and 28 may be simplified by dividing out a factor of 5 as shown in steps 29 and 30, and the coefficients of step 30 may be delayed two sample lengths to line up the end point data as shown in steps 31 and 32. Matrix multiplication again eliminates the end point data by addition of steps 33 and 34 to obtain 6×ACO (1, 1) as shown in step 35. A similar procedure is applied to eliminate the left-hand end point data to obtain 6×ACO (1, 1) as shown in step 36.

The result of the procedure of FIG. 2 is to obtain two independent measure of the data ACO (1,1) displaced apart from one another by one sample length. Accuracy of the resulting data may be determined by comparing the two values obtained, since these values as a function of displacement along the rails should be equal.

Several significant factors must be noted in performing the technique shown in FIG. 2. The first factor is that the various delay, multiplication and addition steps do not change the relative weighing factors of the data for each of the two groups of three sensors. Thus, at all times the relative weight of sensors 4, 6 and 8 as well as the relative weights attributed to the data from sensors 6, 8 and 10 are such as to ensure that the data is insensitive to rigid body motion. The second significant feature to note is that the answer obtained in the final steps is no longer asymmetric data but rather symmetric data since $n=m=1$. Thus, 6×ACO (1, 1) =6×MCO (1). That is, the asymmetric cord offset data has been converted to the mid-cord offset data in which two end sensors are employed in combination with a third sensor positioned exactly in the middle of the end point sensors.

The third significant feature to note is that the mid-cord offset data is directly proportional to the second finite difference data since the mid-cord offset and second finite difference are related by the well known formula:

$$SFD = -2\, MCO \qquad (3)$$

It is of interest to note that the original ACO measurements have been converted to a MCO measurement, and the MCO measurement itself may be thought of as corresponding to the symmetric positioning of these hypothetical sensors. These hypothetical sensors may be imagined at all the steps which have m, n, values other than (3, 8) and (8, 3), i.e. other than those corresponding to the positions of the actual sensors. The numbers obtained by the delays, cross mulitplication and addition/subtraction steps, are numbers based wholly upon the real ACO measurements; but the fact that they correspond to, at first ACO measurements with smaller and small (m, n) values, and finally with the symmetric $m=n=1$ values permits one to think in terms of simulating the results of hypothetical sensors positioned at these smaller (m, n) values, and finally at the symmetric $m=n=1$ value. The cancellation of terms in the steps of FIG. 2 results from the use of two ACO measurements which are mirror images of one another. For example, the first ACO measurement (m=3, n=8) using sensors 4, 6 and 8 is the mirror image of the second ACO measurement (m=8, n=3) using sensors 6, 8 and 10.

As the sensors move along the rail, the procedure of FIG. 2 is repeated for every data sample. After an initial start-up, in the specific example, 8 samples, delayed (stored) data samples exist for every subsequent sample set of data so that the steps in FIG. 2 can be done for each set of sample data (four sensor outputs) to derive a MCO value. The set of MCO values so derived may then be converted into a set of second finite difference values and subsequently to the desired space curve.

Figure 3:
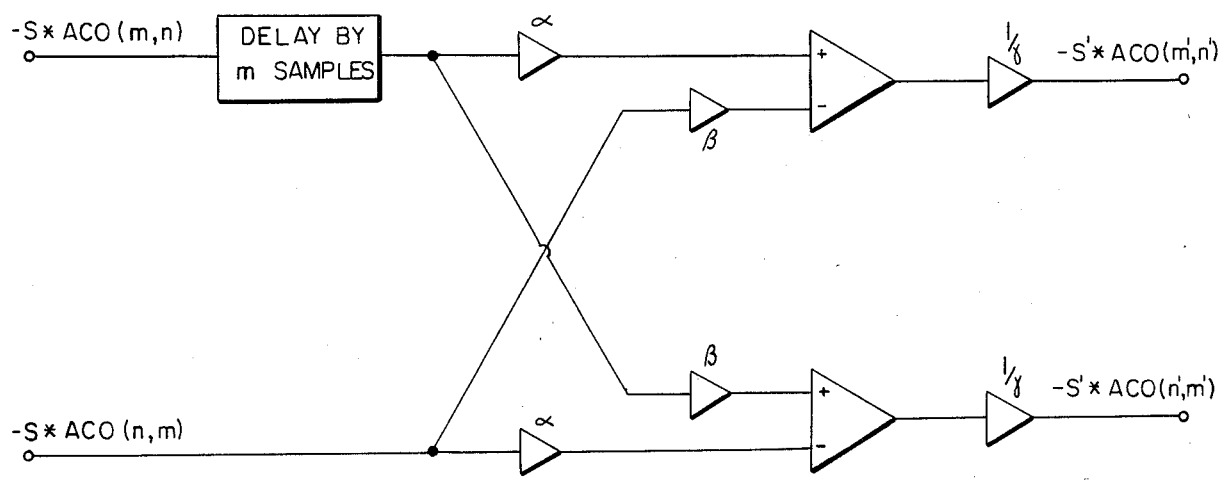
FIG. 3 illustrates a portion of the serial processing hardware which may be utilized in processing data in accordance with the principles of the invention.

The procedures set forth in FIG. 2 may be generalized for implementation by an electronic filter circuit using digital processing techniques. The serial processing may be implemented as shown in FIG. 3 in which plural circuits of the type shown would be serially connected with the multiplying coefficients as indicated. The delay of the sample data is easily obtained in digital processing techniques simply by looking at the stored output of the sensors at any of the desired sample points along the rail to be measured. The data processing apparatus 24 may comprise a digital computer programmed to perform the data processing steps illustrated in FIG. 2 and generalized in FIG. 3. The data processing apparatus 24 may contain A/D converters for converting the sensor analog signals into digital form for use by the digital computer. A separate A/D may be used for each sensor with the A/D conversion taken for all sensors at each fixed sample distance interval L.

Figure 4:
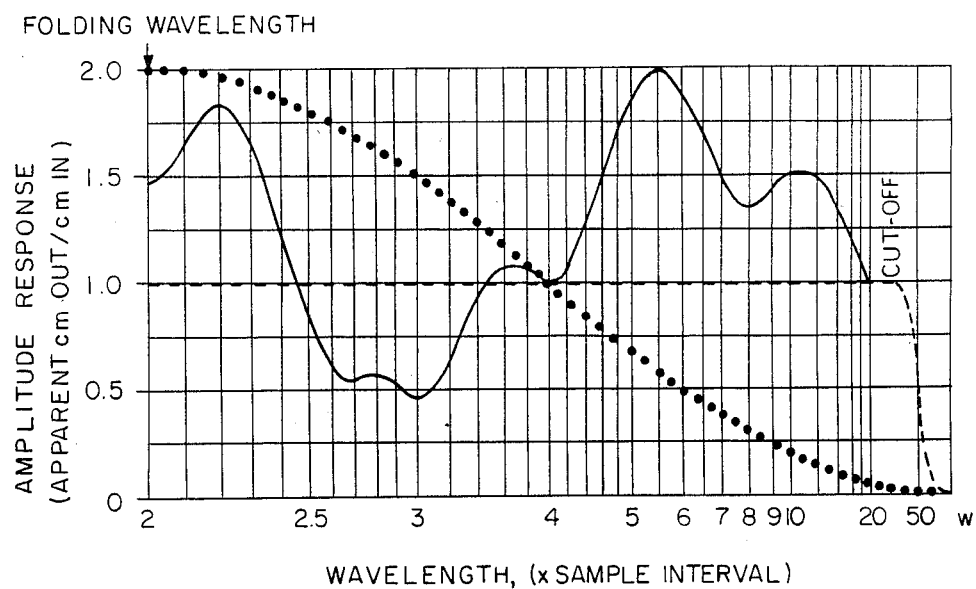
FIG. 4 illustrates the amplitude response versus wavelength characteristics for the asymmetric cord offset measurements as well as for the second finite difference measurements and resulting space curve of interest.

A graphical representation of the response of the ACO measurements as well as the generated SFD data is shown in FIG. 4. The response of ACO (8, 3) as a function of wavelength is shown by the solid line in FIG. 4. It is seen that the ACO measurement exhibits a very good response to all wavelengths between 2 and 33 sample intervals. In fact, over this wavelength range, no more than a factor of 2 in gain need be applied to any wavelength to recover the uniform response of the space curve shown by the dashed line. The response of the space curve is shown at unity gain and is seen to cut off at 33 sample interval wavelengths. Longer wavelength coverage is possible provided the noise characteristics of the measurements permit.

The solid line illustrates the response characteristic of ACO(8,3) or alternately ACO(3,8). Conversion of the ACO(8,3) data into the ACO(1,1) data results in the response curve shown by the dotted line of FIG. 4. While the response of this measurement at longer wavelengths is relatively poor, the computations which are utilized to obtain the SFD data are done digitally which provide for good dynamic range, i.e. good signal to noise ratio. In a typical situation, the sample interval may be ½ inch such that the wavelengths of interest may range from the folding wavelength of 1.0 inches to the upper limit of interest of approximately 20 inches.

Figure 5:
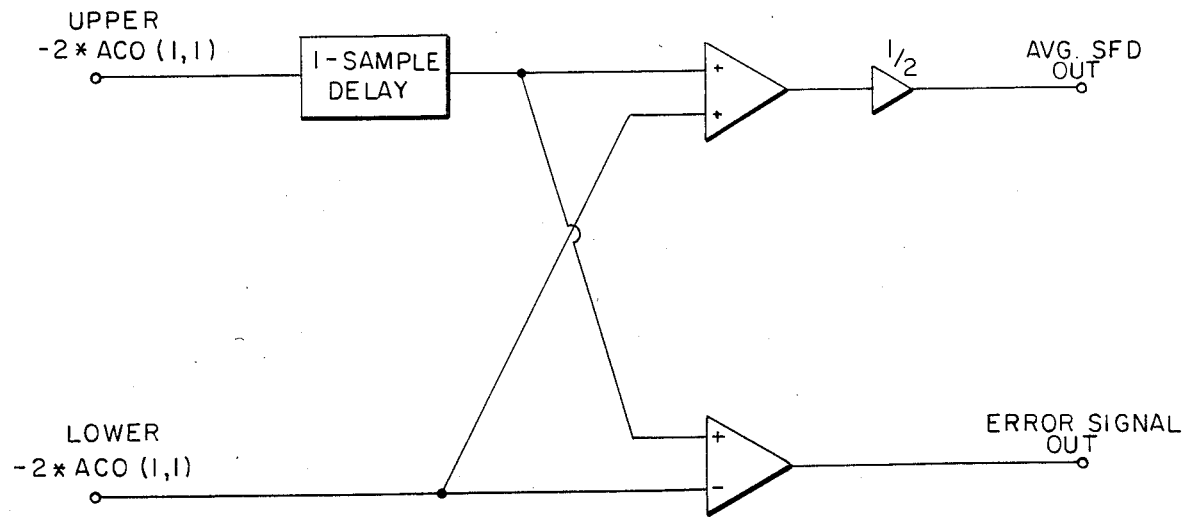
FIG. 5 shows a final output stage utilized in computing the average second finite difference and the error signal in accordance with the principles of the invention.
Figure 8A:
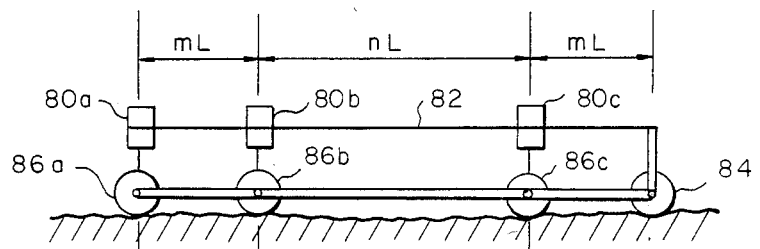
FIGS. 8A–8D show yet a fourth embodiment of the invention utilizing three contact-type sensors in accordance with the principles of the invention.
Figure 8B:
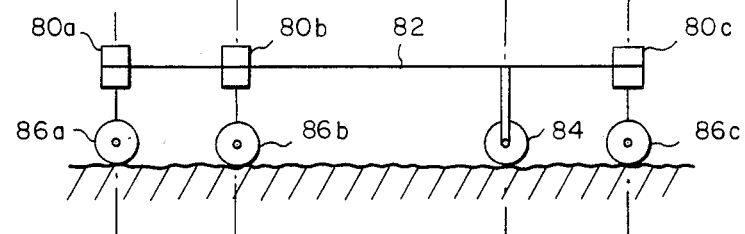
Figure 8C:
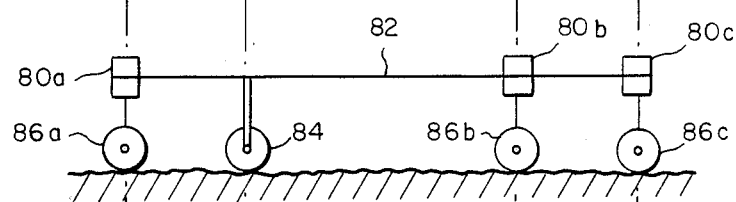
Figure 8D:
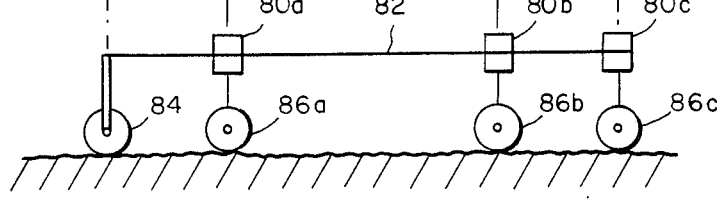

It is to be noted that the procedure illustrated in FIG. 2 results in a single measurement which can be plotted on the SFD curve of FIG. 4. The whole process may be repeated with the initial position of the four sensors displaced one sample point. It is also noted that the procedure of FIG. 2 yields two ACO(1,1) measurements, one of which leads the other by one sample interval. These two ACO measurements are derived through totally different combinations of the original raw sensor data. Thus, if the two SFD's do not behave identically (except for the delay), the resulting data will indicate that there is a problem somewhere in the system. This problem could be indicative of a failed sensor, a noisy sensor, poor calibration or an error in the data processing system. Since under normal conditions the two independent measurements are expected to result in the same representation of the SFD curve except for the delay factor, and, under an error condition the data from the two processing techniques should be different, one may derive a final error detecting output stage as shown in FIG. 5. The output stage may be utilized as the final stage in the sequence of multiple processing apparatus illustrated in FIG. 4. The two ACO data are termed "upper" and "lower" as illustrated in FIG. 5. The upper and lower data are added together with the appropriate delay and the sum value is multiplied by a factor of ½. This result produces an average SFD output signal which is useful in increasing the signal to noise ratio. An error signal output will be provided by delaying the upper ACO data and subtracting the upper and lower data to produce an error output signal. If the subtracted data is zero, there is no output signal. An error signal of any magnitude (positive or negative) may be displayed on display device 26 and utilized to assess overall system performance. For example, an error signal will be derived when there is a signal at sensor 4 which is not subsequently seen by any one of sensors 6, 8 or 10 at the appropriate space interval.

The utilization of four sensors is not absolutely essential in connection with the general principles of the invention. For example, as illustrated in FIG. 6A, two sensors 40 and 42 may be utilized and secured to a chassis 44 supported by means of wheels 46. The relative distance of the sensors from the wheels 46 is such as to produce the asymmetric cord measurement m, n as shown in FIG. 6. In this embodiment of the invention, the wheels 46 effectively replace the end point sensors, and, for this purpose, it is assumed that the wheels are always in good contact with the rail surface. One may envision this embodiment as simply a four sensor measurement in which the end point measurements are held fixed. That is, the fixed wheel positions relative to the rail are utilized as constant sensor output values. The sensors are nevertheless individually responsive to the movement of the wheels 46 over perturbations in the rail surface since the wheels, assuming good contact, will tilt the support 44 in response to such perturbations. The ACO measurements, however, combine and weight the sensor data and are insensitive to such rigid body motion of the beam.

FIGS. 6B and 6C show in schematic form alternate embodiments of the arrangement of FIG. 6A.

FIG. 7 shows an alternate approach to the two sensor embodiment of the invention in which a full contact system is employed. In FIG. 7 the sensors 50 and 52 may take the form of electromechanical devices such as linear variable differential transformers or linear potentiometers in which an electrical signal is provided in response to the mechanical vertical movement of rigid rod members 54 and 56 connected to feeler wheels 58 and 60. The feeler wheels 58 and 60 are connected to the support wheels 62 and 64 via connecting links 66 and 68. The support wheels 62 and 64 support the support member 70 to which the sensors 50 and 52 are attached.

FIGS. 7B and 7C show schematic illustrations of alternate embodiments of FIG. 7A.

As an alternative to the fixed contact provided by support wheels 62 and 64, various devices can be employed such as strain gauges, pulley systems, etc., to effect the cancellation of rigid body motion thereby permitting the required number of sensor to be two.

Yet other embodiments of the invention are illustrated in FIGS. 8A–8D. In these figures, three contact-type sensors 80a, 80b and 80c are secured to the support 82. The support itself is attached to the axle of the support wheel 84. Feeler wheels 86a, 86b and 86c and their piston members are associated with the sensors 80a, 80b and 80c, respectively. The feeler wheels are connected via links 88 (for simplicity, shown only in FIG. 8A) to the axle of the support wheel 84. The support wheel 84 may be taken to be a fourth sensor assuming a constant support/surface distance. This assumption is good for low and moderate speeds, but during high speed operation some wheel/surface separation may be experienced over certain rough surface sections.

Optimal design of the system may be obtained by choosing one of the constants (m, n) to be small for enhancing the short wavelength sensitivity of the system and choosing the other constant to be large thus enhancing long wavelength performance. Such a choice permits the system to be readily applicable to a standard railway coach having four axles, specifically, two axles each on two widely separated bogies. It is also noted that the smallest constant need not be one. For example, if the sample spacing is one foot, it is not necessary to space the sensors one foot apart. The sensors can thus be spaced apart such that they do not cause mutual interference. This spacing allowance is particularly important in utilizing non-contacting sensors.

Figure 9:
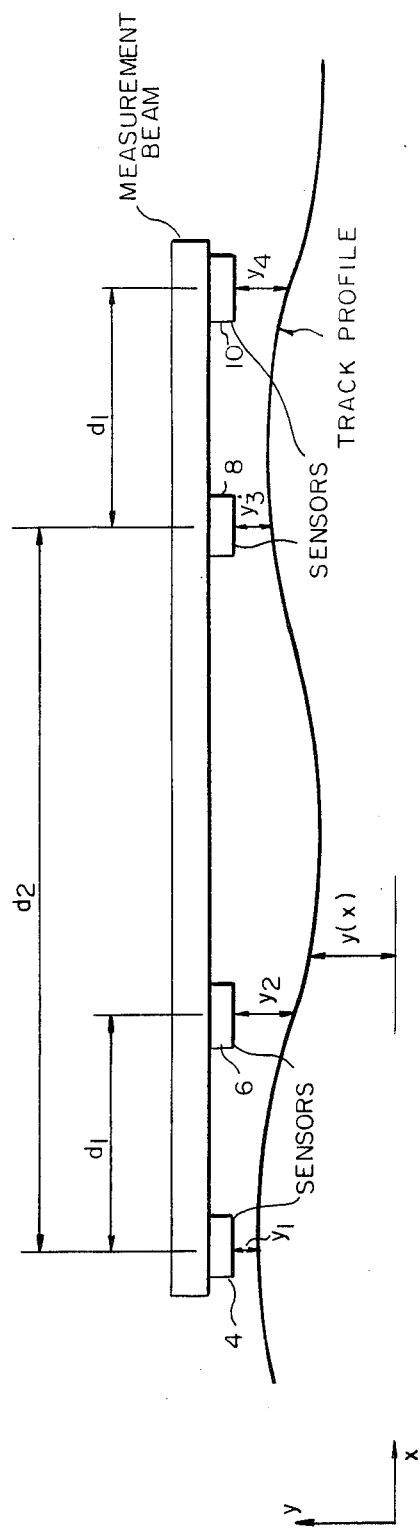
FIG. 9 illustrates a geometrical arrangement of four sensors of the non-contact type similar to that shown in FIG. 1 but representing yet another embodiment of the invention.

A second technique for driving a mid-cord offset value from an asymmetric cord offset value may be developed utilizing the arrangement shown in FIG. 9. The arrangement is similar to FIG. 1 employing sensors 4, 6, 8 and 10. Sensors 4 and 6 as well as sensors 8 and 10 are spaced apart by a distance $d_1 = nL$ where n is an integer and L is the sampling interval. Sensors 4 and 8 as well as sensors 6 and 10 are spaced apart by a distance $d_2 = mL$ where m is an integer. Again, m and n are selected to have no common factors to prevent the appearance of nulls in the sensor response. Utilizing the four sensors of FIG. 9, one may derive two measurements which are each insensitive to rigid body motions (both translational and rotational). These two measurements may be defined as follows:

$$g = -y(4) + y(6) + y(8) - y(10) \quad (4)$$

$$h = (1-e) y(4) - (1+e) y(6) + (1+e) y(8) - (1-e) y(10) \quad (5)$$

where $e = n/m$ and m and n are integers chosen to have no common factors. Equation 4 may be termed the symmetric measurement whereas equation 5 may be termed the asymmetric measurement. The nomenclature is derived from the symmetric and asymmetric values of the resulting coefficients with respect to the center of the four detectors. The data may be analyzed by tabulating the resulting coefficients in a similar fashion as was done in FIG. 2. Such a tabulation is shown in FIG. 10. In FIG. 10, step 1 illustrates equation 4 and step 2 illustrates equation 5 for the values (m, n) = (2, 11). In step 3, the coefficients of step 1 are multiplied by 9, and in step 4, the coefficients of step 2 are multiplied by 11. It may be seen that the left-hand end point coefficients will zero out when the coefficients of steps 3 and 4 are added together. However, prior to adding, additional coefficients are taken one step advanced over those shown in steps 3 and 4. These additional coefficients are also selected to cancel out upon addition and may be chosen as indicated in steps 5 and 6. In step 5, the coefficients of step 1 are multiplied by $-18$ and advanced one time sample interval; and in step 6, the coefficients of step 4 are multiplied by $-2$ and advanced one sample step interval. In step 7, the coefficients of step 1 are multiplied by a factor of 14 and the data is taken at a sample point advance two intervals from that of step 1. Similarly, in step 8, the coefficients of step 4 are multiplied by a factor of 2 and likewise advanced to be taken at a point of two sample intervals ahead of the data of step 2. In a similar fashion, steps 9–26 may be derived in which each pair of samples is successively displaced one sample point from the previous sample. The data is selected so that the sum of all sample data coefficents shown in steps 3–26 will add up to a mid-cord offset value such as illustrated by the sum coefficients (44, $-88$, 44). The obtained mid-cord offset value may be divided by $-88$ to place it in the standard form of a mid-cord offset $-\frac{1}{2}$, 1, $-\frac{1}{2}$ which is related to the second finite difference in accordance with equation 3.

The symmetric and asymmetric measurements may also be used when only two sensors are employed with two other points making contact with the surface similar to the arrangements shown in FIGS. 6A–6C. The geometry can be defined in relation to FIG. 9 by imagining sensors 4 and 10 replaced by rail wheels, and maintaining $d_1 = nL$ and $d_2 = mL$. In this case the asymmetric cord is simply defined as ACO(m,n) $= y(6)$ with the symmetric cord defined as ACO(n,m) $= y(8)$. The two rigid body insensitive measurements corresponding to equations (4) and (5) respectively then become:

$$g = y(6) + y(8)$$

$$h = y(6) - y(8).$$

The subsequent data analysis may then proceed in a similar fashion as in FIG. 10.

Figure 11A:
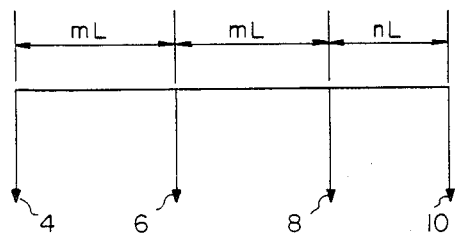
FIGS. 11A and 11B show a first alternative embodiment to that of FIG. 1 wherein the sensor configuration is non-symmetric.

It will be appreciated that other configurations of four sensors may be devised, as, for example, certain modifications of FIG. 1. One such alternative is shown in FIG. 11. Again, L is the sample length, and m and n are integers having no common factors. In FIG. 11A, the four sensors can be combined to give a first ACO measurement considering sensors 4, 6 and 10 and a second ACO measurement considering sensors 6, 8 and 10. Thus, $$ACO\,(m, m+n) = \frac{-m+n}{2m+n} y(4) + y(6) - \frac{m}{2m+n} y(10) \quad (6)$$

$$ACO\,(m+n) = \frac{-n}{m+n} y(6) + y(8) - \frac{m}{m+n} y(10) \quad (7)$$

Figure 11B:
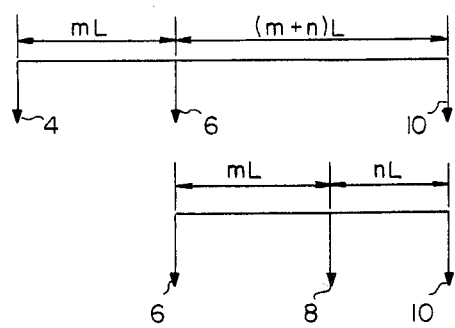

If the sensors are moving to the left as seen in FIG. 11A, one can delay ACO(m,m+n) by m to get sensor 4 to line up with sensor 6 of ACO(m,n) as seen in FIG. 11B. Alternatively, if moving to the right, ACO(m,n) may be delayed the same amount.

The subsequent data analysis may be seen in FIG. 12. In step 1 ACO(m,m+n) given by equation (6) is multiplied by (2m+n), and in step 2, ACO(m,n) is multiplied by (m+n). In step 3, the results of step 1 are multiplied by n, and in step 4 the results of step 2 are multiplied by $-(m+n)$. Next steps 3 and 4 are added together in step 5. Step 5 is seen to be simply m(m+n) ACO(n,m) as shown in step 6. The result of step 6 may thus be recognized as a multiple of the mirror image of ACO(m,n). Mirror image ACO's may be processed as described above in reference to FIGS. 1 and 2.

Figure 13A:
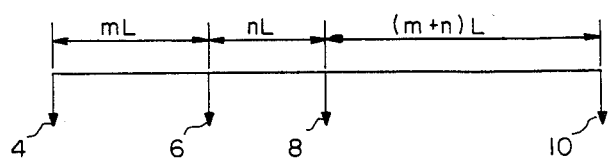
FIGS. 13A and 13B show a second alternative embodiment to that of FIG. 1 wherein the sensor configuration is non-symmetric.

A second alternative is shown in FIG. 13. In FIG. 13A, the sensors 4, 6, 8 and 10 are distributed as shown. The sensors 4, 6, 8 may be combined to give a first ACO measurement, and the sensors 6, 8 and 10 combined to give a second ACO measurement with the result:

$$ACO\,(m,n) = \frac{-n}{m+n}\,y(4) + y(6) - \frac{m}{m+n}\,y(8) \qquad (8)$$

$$ACO\,(n,m+n) = \frac{m+n}{-2n+m}\,y(6) + y(8) + \frac{-n}{2n+m}\,y(10) \qquad (9)$$

Figure 13B:
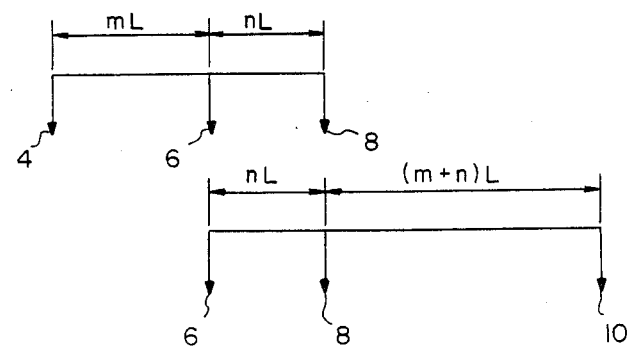

Again, if moving to the left as seen in FIG. 13B, ACO(m,n) is delayed by m samples to get sensors 4 and 8 of the ACO(m,n) measurement to line up with sensors 8 and 10 of the ACO(n,m+n) measurement. Alternately, if moving to the right, ACO(n,m+n) is delayed by m samples. Subsequent data analysis is seen in FIG. 14. In step 1, ACO(m,n) of equation (8) is multiplied by (m+n), and in step 2, ACO(n,m+n) of equation (9) is multiplied by (2n+m). In step 3, the results of step 1 are multiplied by −n, and in step 4, the results of step 2 are multiplied by m. Steps 3 and 4 are added in step 5 with the results recognized to be $(m+n)^2$ ACO(n,m) as seen in step 6. But ACO(n,m) is again simply the mirror image of ACO(n,m) so the subsequent analysis may proceed as described before in reference to FIGS. 1 and 2.

The alternatives described in reference to FIGS. 11–14 illustrate that it is possible to apply the data analysis methods in accordance with the invention even if the sensors are positioned in configurations which do not define mirror image ACO measurements. A combining of the ACO measurements which may include a delay, multiply (divide) and add (subtract) sequence can convert the sensor configuration into ACO configurations which are mirror images of one another so that the mirror image ACO analysis may proceed as previously described.

Figure 15:
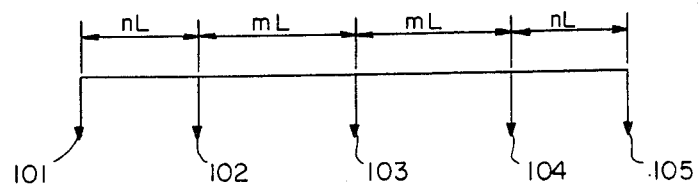
FIG. 15 is another embodiment of the invention using five sensors.

It is sometimes desirable to utilize a five sensor configuration as seen in FIG. 15. In this arrangement, sensors 101, 102 and 103 form a first ACO measurement with sensors 103, 104 and 105 forming a second ACO measurement. In the event of failure of one of the sensors, it is possible to proceed with the data analysis by resorting to one of the configurations as set forth in FIGS. 11 or 13. Data collection is not dependent upon the subsequent data analysis, so it is not necessary to be able to detect a sensor failure during the data collection process. The five sensor approach thus provides an added degree of security against sensor failure.

Although the invention has been described in relation to certain preferred embodiments, it should be understood that various modifications and improvements may be made without departing from the true spirit and scope of the invention as defined in the appended claims.

What is claimed is:

1. A method of measuring surface roughness comprising the steps of:
   (a) spacing a plurality of sensors along said surface at predetermined distances apart from one another, each of said sensors generating sensor-surface distance data, said spacing sleected such that the response characteristic of said plurality of sensors is non-zero for all wavelengths of surface roughness in excess of a predetermined folding wavelength,
   (b) relatively moving said sensors and said surface,
   (c) while relatively moving said sensors, sampling data from sensors at fixed sample distance intervals L,
   (d) storing data from said sensors measured over a region of said surface,
   (e) converting said data into second finite difference data over said region,
   (f) converting said second finite difference data into data representative of a space curve of said surface, and
   (g) displaying said space curve representative data to provide an indication of surface roughness.

2. A method of measuring surface roughness comprising the steps of:
   (a) securing first, second, third and fourth sensors to a rigid support,
   (b) relatively moving said rigid support with said secured sensors and said surface,
   (c) while relatively moving said support and surface, sampling data outputs of all of said sensors at fixed sample distance intervals L,
   (d) said securing step including positioning said first and second sensors apart by a distance mL, said second and third sensors by a distance nL, and said third and fourth sensors by a distance mL, where m and n are integers having no common factors, said sensors thereby positioned to form a first asymmetric cord configuration, comprising sensors one, two and three, and a second asymmetric cord configuration comprising sensors two, three and four, said first and second asymmetric cord configurations being mirror images of one another about a plane midway between sensors two and three,
   (e) processing said sampled data outputs in a data processing device, said processing step including
      (i) weighing the data outputs from said first, second and third sensors in accordance with their relative displacements as defined by the integers m, n, to form a first asymmetric cord offset (ACO) measurement,
      (ii) weighing the data outputs from said second, third and fourth sensors in accordance with their relative displacements as defined by the integers m, n, to form a second ACO measurement, said first and second ACO measurements insensitive to rigid body motion,
      (iii) combining said first and second ACO measurements to form at least one midcord offset (MCO) measurement corresponding to weighted data from first, second and third hypothetical sensors positioned one sample distance interval apart,
      (iv) converting said MCO measurement into second finite difference data, and
      (v) converting said second finite difference data into data representative of a space curve of said surface, and
   (f) displaying said space curve representative data for providing a measurement of surface roughness.

3. A method as recited in claim 2, wherein said processing step further includes the steps of:
   (a) combining said first and second ACO measurements to form another MCO measurement, and (b) comparing said one and another MCO measurement,
and wherein said method further comprises the step of generating an error signal when said compared one and another MCO measurements are not equal.

4. A method as recited in claim 3, wherein said another MCO measurement corresponds to weighted data from a fourth, fifth and sixth hypothetical sensor positioned one sample distance interval apart, said another MCO measurement displaced a fixed sample interval from said one MCO measurement.

5. A method as recited in claim 2, wherein said securing step includes positioning said sensors for non-contacting movement relative to said surface, said sensors being of the non-contact type.

6. A method as recited in claim 5, wherein said sampling step includes sampling data outputs from first, second, third and fourth acoustic sensors.

7. A method as recited in claim 5, wherein said sampling step includes sampling data outputs from first, second, third and fourth optical sensors.

8. A method as recited in claim 5, wherein said sampling step includes sampling data outputs from first, second, third and fourth eddy current sensors.

9. A method as recited in claim 2, wherein said securing step includes positioning said sensors for contacting movement relative to said surface, said sensors being of the contact-type.

10. A method as recited in claim 2, wherein said first ACO measurement is given by:

$$ACO\ (m,n) = \frac{-n}{m+n} y(1) + y(2) - \frac{m}{m+n} y(3)$$

and said second ACO measuremen is given by:

$$ACO\ (n,m) = \frac{-m}{m+n} y(2) + y(3) - \frac{n}{m+n} y(4)$$

where y(1), y(2), y(3) and y(4) are the outputs of said first, second, third and fourth sensors, respectively.

11. A method as recited in claim 10, wherein said combining steps includes delaying said first ACO measurement by m samples relative to said second ACO measurement.

12. A method as recited in claim 2, wherein said sampling, processing and displaying steps are performed in real-time.

13. A method as recited in claim 2, wherein said surface is a rail, said rigid support is a vehicle body mounted for movement along said rail and said roughness measurement corresponds to rail corrugation measurements.

14. A method as recited in claim 13, wherein said securing step includes positioning said sensors for non-contacting movement relative to said surface, said sensors being of the non-contact type.

15. A method as recited in claim 13, wherein said processing step further includes the steps of:
(a) combining said first and second ACO measurements to form another MCO measurement, and
(b) comparing said one and another MCO measurement, and wherein said method further comprises the step of generating an error signal when said compared one and another MCO measurements are not equal.

16. A method as recited in claim 13, wherein said first ACO measurement is given by:

$$ACO\ (m,n) = \frac{-n}{m+n} y(1) + y(2) - \frac{m}{m+n} y(3)$$

and said second ACO measurement is given by:

$$ACO\ (n,m) = \frac{-m}{m+n} y(2) + y(3) - \frac{n}{m+n} y(4)$$

where y(1), y(2), y(3) and y(4) are the outputs of said first, second, third and fourth sensors, respectively.

17. A method as recited in claim 13, wherein said sampling, processing and displaying steps are performed in real-time.

18. A method of measuring surface roughness comprising the steps of:
(a) securing at least first and second sensors to a rigid support, said sensors being of the contact-type and having at least an operative portion thereof connected for measuring the relative displacement between said support and surface at first and second sensor contact points, respectively,
(b) contacting said support and said surface at first and second support contact points distinct from said sensor contact points,
(c) relatively moving said support and surface thereby moving said sensors and support contact points along said surface,
(d) while relatively moving said support and surface, sampling data outputs of all of said sensors at fixed sample distance intervals L,
(e) said securing step including positioning said first sensor contact point and said first support contact point a distance mL apart, m being an integer, said second sensor contact point and said second support contact point a distance mL apart, and one of: (1) said first and second sensor contact points a distance nL apart, n being an integer and m, n selected to have no common factors, thereby forming a first asymmetric cord offset (ACO) configuration defined by said first support contact point, said first sensor contact point and said second sensor contact point; and a second ACO configuration defined by said first sensor contact point, said second sensor contact point and said second support contact point, said first and second ACO configurations being mirror images of one another about a plane midway between said first and second sensor contact points, and (2) said first and second support contact points a distance mL apart thereby forming one ACO configuration defined by said first sensor contact point, said second support contact point and said third support contact point; and another ACO configuration defined by said first support contact point, said second support contact point and said second sensor contact point, said one and another ACO configuration being mirror images of one another about a plane midway between said first and second support contact points,
(f) processing said sampled data outputs in a data processing device, said processing step including:
(i) weighing the data outputs from said sensors in one of: (1) said first and second ACO configurations in accordance with the relative contact point displacements defined by m, n to form a first and second ACO measurement, said ACO measurements being insensitive to rigid body motion of said support, and (2) said one and another ACO configurations in accordance with the relative contact point displacements defined by m, n to form one and another ACO measurement, said one and another ACO measurements being insensitive to rigid body motion of said support, (ii) combining one of: (1) said first and second ACO measurements to form at least a first mid-cord offset (MCO) measurement corresponding to hypothetical contact points having relative displacements defined by m=n=1 and (2) said one and another ACO measurements to form at least one MCO measurement corresponding to hypothetical contact points having relative displacements defined by m=n=1, (iii) converting one of: (1) said first MCO measurement into data representative of a space curve of said surface and (2) said one MCO measurement into data representative of a space curve of said surface, and (g) displaying said space curve representative data for providing a measure of surface roughness.

19. A method as recited in claim 18, wherein said processing step further includes the steps of:
(a) combining one of (1) said first and second ACO measurements to form a second MCO measurement, and (2) said one and another ACO measurement to form another MCO measurement, and
(b) combinining one of (1) said first and second MCO measurements and (2) said one and another MCO measurement, and wherein said method further comprises the step of generating an error signal when one of (1) said compared first and second MCO measurements are not equal and (2) said compared one and another MCO measurements are not equal.

20. A method as recited in claim 18, wherein said sampling, processing and displaying steps are performed in real-time.

21. A method as recited in claim 18, wherein said surface is a rail, said rigid support is a vehicle body mounted for movement along said rail and said roughness measurement corresponds to rail corrugation measurements.

22. A method of measuring surface roughness comprising the steps of:
(a) securing at least first, second and third sensors to a rigid support, said sensors being of the contact-type and having at least an operative portion thereof connected for measuring the relative displacement between said support and surface at first, second and third sensor contact points, respectively,
(b) contacting said support and said surface at a first support contact point distinct from said sensor contact points,
(c) relatively moving said support and surface thereby moving said sensor and support contact points along said surface,
(d) while relatively moving said support and surface, sampling data outputs of all of said sensors at fixed sample distance intervals L,
(e) said securing step including positioning said first and second sensor contact points a distance mL apart, m being an integer, said third sensor contact point and said first support contact point a distance mL apart, and said second and third sensor contact points a distance nL apart, where n is an integer and m, n are selected to have no common factors, thereby forming a first asymmetric cord offset (ACO) configuration defined by said first sensor contact point, said second sensor contact point and said third sensor contact point and a second ACO configuration defined by said second sensor contact point, said third sensor contact point and said first support contact point, said first and second ACO configurations being mirror images of one another about a plane midway between said second and third contact points, (f) processing said sampled data outputs in a data processing device, said processing step including:
(i) weighing the data outputs from each sensor in said first and second ACO configurations in accordance with the relative contact point displacements defined by integers m, n to form first and second ACO measurements,
(ii) combining said first and second ACO measurements to form first mid-cord offset (MCO) measurements corresponding to hypothetical contact points defined by m=n=1 and
(iii) converting said first MCO measurements into data representative of a space curve of said surface, and (g) displaying said space curve representative data for providing a measure of surface roughness.

23. A method as recited in claim 22, wherein said processing step further includes:
(a) combining said first and second ACO measurements to form a second MCO measurement, and
(b) comparing said first and second MCO measurements,
and wherein said method further comprises generating an error signal when said first and second MCO measurements are not equal.

24. A method as recited in claim 22, wherein said first ACO measurement is given by:

$$ACO\,(m,n) = \frac{-n}{m+n}\,y(1) + y(2) - \frac{m}{m+n}\,y(3)$$

and said second ACO measurement is given by:

$$ACO\,(n,m) = \frac{-m}{m+n}\,y(2) + y(3) - \frac{n}{m+n}\,y(4)$$

where y(1), y(2), y(3) and y(4) are the outputs of said first, second, third and fourth sensors, respectively.

25. A method of measuring surface roughness comprising the steps of:
(a) securing first, second, third and fourth sensors to a rigid support,
(b) relatively moving said rigid support with said secured sensors and said surface,
(c) while relatively moving said support and surface, sampling data outputs of all of said sensors at fixed sample distance intervals L,
(d) said securing step including positioning said first and second sensors apart by a distance nL, said first and third sensors apart by a distance mL and said third and fourth sensors apart by a distance nL, m, n being integers having no common factors, said first and second sensors being the mirror image of said third and fourth sensors with respect to a plane midway between said second and third sensors,
(e) processing said sampled data outputs in a data processing device, said processing steps including:

(i) weighing the data outputs from all of said sensors to form a first measurement which is insensitive to rigid body motion,
(ii) weighing the data outputs from all of said sensors to form a second measurement which is insensitive to rigid body motion,
(iii) combining said first and second measurements to form a mid-cord offset (MCO) measurement corresponding to weighted data from first, second and third hypothetical sensors positioned one sample distance interval apart,
(iv) converting said MCO measurement into data representative of a space curve of said surface, and
(f) outputting said space curve representative data for displaying a measurement of surface roughness.

26. A method as recited in claim 25, wherein said securing step includes positioning said sensors for non-contacting movement relative to said surface, said sensors being of the non-contact type.

27. A method as recited in claim 25, wherein said first measurement, g, is given by:

$$g = -y(1) + y(2) + y(3) - y(4)$$

and said second measurement, h, is given by:

$$h = (1-e)y(1) - (1+e)y(2) + (1+e)y(3) - (1-e)y(4)$$

where $e = n/m$.

28. A method of measuring surface roughness comprising the steps of:
(a) securing a first and second sensor to a rigid support, said sensors being of the non-contact type,
(b) contacting said support in said surface at first and second contact points, said contact points being removed from said position of said sensors,
(c) relatively moving said support and surface thereby moving said support contact points along said surface,
(d) said securing step including positioning said first contact point and said first sensor apart by a distance mL, said second contact point and said second sensor apart by a distance mL and one of (1) said first and second sensors spaced apart by a distance nL, where m, n are integers having no common factors and said distances are measured along the direction of relative motion of said surface and support, thereby forming a first asymmetric cord offset (ACO) configuration defined by said first contact point, said first sensor and said second sensor, and a second ACO configuration defined by said first sensor, said second sensor and said second contact point, said first and second ACO configurations being mirror images of one another about a plane midway between said first and second sensors, and (2) said first and second contact points spaced apart by a distance nL thereby forming one ACO configuration defined by said first sensor, said first contact point and said second contact point, and another ACO configuration defined by said first contact point, said second contact point and said second sensor, said one and another ACO configurations being mirror images of one another about a plane midway between said first and second contact points,
(e) processing said sampled data outputs in a data processing device, said processing steps including:

(i) weighing the data outputs from said sensors in one of (1) said first and second ACO configurations in accordance with the relative displacements of said sensors and contact points defined by m, n, to form a first and second ACO measurement, said first and second ACO measurements insensitive to rigid body motion of said support, and (2) said one and another ACO configurations in accordance with the relative displacements of said sensors and contact points defined by m, n to form one and another ACO measurement, said one and another ACO measurements insensitive to rigid body motion of said support,
(ii) combining one of (1) said first and second ACO measurements to form at least a first mid-cord offset (MCO) measurement corresponding to hypothetical contact points and sensors having relative displacements defined by $m = n = 1$ and (2) said one and another ACO measurements to form at least one MCO measurement corresponding to hypothetical contact points and sensors having relative displacements defined by $m = n = 1$, and
(iii) converting one of (1) said first MCO measurement into data representative of a space curve of said surface and (2) said at least one MCO measurement into data representative of a space curve of said surface, and
(f) outputting said space curve representative data for displaying a measurement of surface roughness.

29. A method as recited in claim 28, wherein said processing step further includes the steps of:
(a) combining one of (1) said first and second ACO measurements to form a second MCO measurement, and (2) said one and another ACO measurement to form another MCO measurement, and
(b) combining one of (1) said first and second MCO measurements and (2) said one and another MCO measurement, and wherein said method further comprises the step of generating an error signal when one of (1) said compared first and second MCO measurements are not equal and (2) said compared one and another MCO measurements are not equal.

30. A method as recited in claim 28 wherein said sampling, processing and displaying steps are performed in real-time.

31. A method as recited in claim 28, wherein said surface is a rail, said rigid support is a vehicle body mounted for movement along said rail and said roughness measurement corresponds to rail corrugation measurements.

32. Apparatus for measuring surface roughness comprising:
(a) a support,
(b) at least two sensors coupled to said support,
(c) means for relatively moving said support and surface to thereby move said sensors longitudinally along said surface,
(d) means for sampling data outputs from said sensors at longitudinal distance intervals L,
(e) said sensors responsive to surface roughness by measuring the component relative displacement of said sensors and surface in a direction perpendicular to said longitudinal relative motion direction,
(f) means for coupling said sensors to said surface to enable said sensors to respond to said component relative displacement at first, second, third and fourth points spaced longitudinally along the direction of longitudinal relative motion, (g) said first and second points spaced apart by a distance mL, said second and third points spaced apart by a distance nL, and said third and fourth points spaced apart by a distance mL, m and n being integers having no common factors, (h) data processing means for processing said data outputs, said data processing means comprising a programmable digital computer operable for:

(i) weighing data outputs of said sensors to form a first asymmetric cord offset (ACO) measurement defined by the point displacements m, n corresponding to a first ACO configuration for said first, second and third points, (ii) weighing data outputs of said sensors to form a second ACO measurement defined by the point displacements m, n corresponding to a second ACO configuration for said second, third and fourth points, said first and second ACO configurations being mirror images of one another about a plane midway between said second and third points, said first and second ACO measurements being insensitive to rigid body motion of said support, (iii) combining said first and second ACO measurements to form a first mid-cord offset (MCO) measurement corresponding to hypothetical points having relative displacements defined by m=n=1, and (iv) converting said first MCO measurement into data representative of a space curve of said surface, and (i) means for displaying said space curve representative data to provide a measure of surface roughness.

33. Apparatus for measuring surface roughness comprising:

(a) a support, (b) at least two sensors coupled to said support, (c) means for relatively moving said support and surface to thereby move said sensors longitudinally along said surface, (d) means for sampling data outputs from said sensors at longitudinaly distance intervals L, (e) said sensors responsive to surface roughness by measuring the component relative displacement of said sensors and surface in a direction perpendicular to said longitudinal relative motion direction, (f) means for coupling said sensors to said surface to enable said sensors to respond to said component relative displacement at first, second, third and fourth points spaced longitudinally along the direction fo longitudinal relative motion, (g) said first and second points spaced apart by a distance mL, said second and third points spaced apart by a distance nL, and said third and fourth points spaced apart by a distance mL, m and n being integers having no common factors, (h) data processing means for processing said data outputs, said data processing means comprising a programmable digital computer operable for:

(i) weighing data outputs from said sensors to form a first measurement insensitive to rigid body motion, (ii) weighing data outputs from said sensors to form a second measurement insensitive to rigid body motion, (iii) combining said first and second measurements to form a mid-cord offset (MCO) measurement corresponding to weighted data from first, second and third hypothetical sensors positioned one sample distance interval L apart, (iv) converting said MCO measurements into data representative of a space curve of said surface, and (i) means for displaying said space curve representative data to provide a measure of surface roughness.

34. Apparatus for measuring surface roughness comprising:

(a) a support, (b) at least two sensors coupled to said support, (c) means for relatively moving said support and surface to thereby move said sensors longitudinally along said surface, (d) means for sampling data outputs from said sensors at longitudinal distance intervals L, (e) said sensors responsive to surface roughness by measuring the component relative displacement of said sensors and surface in a direction perpendicular to said longitudinal relative motion direction, (f) means for coupling said sensors to said surface to enable said sensors to respond to said component relative displacement at first, second, third and fourth points spaced longitudinally along the direction of longitudinal relative motion, (g) said first and second points spaced apart by a distance mL, said second and third points spaced apart by a distance mL, and said third and fourth points spaced apart by a distance nL, m and n being integers having no common factors, (h) data processing means for processing said data outputs, said data processing means comprising a programmable digital computer operable for:

(i) weighing data outputs of said sensors to form a first asymmetric cord offset (ACO) measurement defined by the point displacements m, m+n corresponding to a first ACO configuration for said first, second and fourth points, (ii) weighing data outputs of said sensors to form a second ACO measurement defined by the point displacements m, n corresponding to a second ACO configuration for said second, third and fourth points, said first and second ACO measurements being insensitive to rigid body motion of said support, (iii) combining said first and second ACO measurements to form mirror image ACO measurements and combining said mirror image ACO measurements to form a first mid-cord offset (MCO) measurement corresponding to hypothetical points having relative displacements defined by m=n=1, and (iv) converting said first MCO measurement into data representative of a space curve of said surface, and (i) means for displaying said space curve representative data to provide a measure of surface roughness.

35. Apparatus for measuring surface roughness comprising:

(a) a support, (b) at least two sensors coupled to said support,
(c) means for relatively moving said support and surface to thereby move said sensors longitudinally along said surface,
(d) means for sampling data outputs from said sensors at longitudinal distance intervals L,
(e) said sensors responsive to surface roughness by measuring the component relative displacement of said sensors and surface in a direction perpendicular to said longitudinal relative motion direction,
(f) means for coupling said sensors to said surface to enable said sensors to respond to said component relative displacement at first, second, third and fourth points spaced longitudinally along the direction of longitudinal relative motion,
(g) said first and second points spaced apart by a distance mL, said second and third points spaced apart by a distance nL, and said third and fourth points spaced apart by a distance (m+n)L, m and n being integers having no common factors,
(h) data processing means for processing said data outputs, said data processing means comprising a programmable digital computer operable for:
  (i) weighing data outputs of said sensors to form a first asymmetric cord offset (ACO) measurement defined by the point displacements m, n corresponding to a first ACO configuration for said first, second and third points,
  (ii) weighing data outputs of said sensors to form a second ACO measurement defined by the point displacements n, m+n corresponding to a second ACO configuration for said second, third and fourth points, said first and second ACO measurements being insensitive to rigid body motion of said support,
  (iii) combining said first and second ACO measurements to form mirror image ACO measurements and combining said mirror image ACO measurements to form a first mid-cord offset (MCO) measurement corresponding to hypothetical points having relative displacements defined by $m=n=1$, and
  (iv) converting said first MCO measurement into data representative of a space curve of said surface, and
(i) means for displaying said space curve representative data to provide a measure of surface roughness.

* * * * *